UNITED STATES PATENT OFFICE.

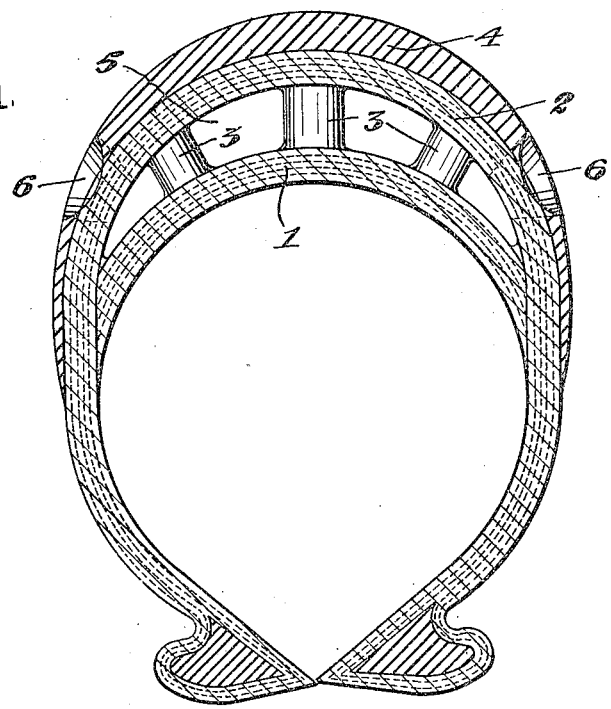
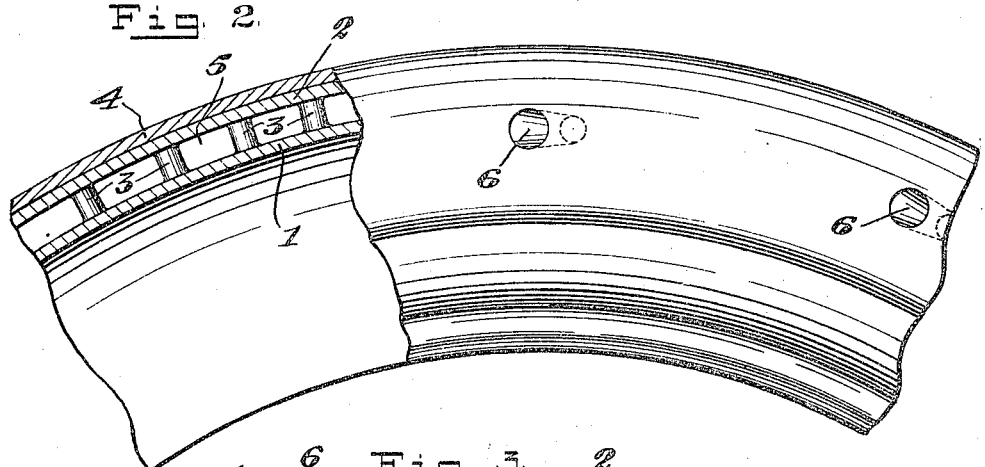
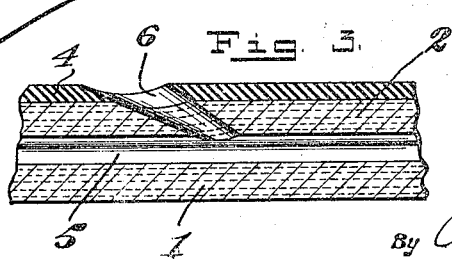

JAMES C. MARKLE, OF SEATTLE, WASHINGTON, ASSIGNOR OF ONE-HALF TO CHARLES F. NAST, OF SEATTLE, WASHINGTON.

TIRE.

1,176,158.  Specification of Letters Patent.  Patented Mar. 21, 1916.

Application filed October 5, 1915. Serial No. 54,131.

*To all whom it may concern:*

Be it known that I, JAMES C. MARKLE, a citizen of the United States of America, and resident of Seattle, in the county of King and State of Washington, have invented certain new and useful Improvements in Tires, of which the following is a specification.

My invention relates to vehicle tires, particularly of the pneumatic type used on automobile wheels.

The object of my invention is to provide means whereby a circulation of air may be induced in contact with the tread side of the tire, to thereby cool the tire and prevent overheating.

The particular features of which my invention consists will be hereinafter described and particularly pointed out in the claim.

In the accompanying drawings I have shown my invention embodied in the form which is now preferred by me.

Figure 1 is a cross section of a tire made in accordance with my invention. Fig. 2 is a side elevation, partially in section, of a short piece of a tire showing my novel features. Fig. 3 is a section through a side of the tire to include one of the holes.

In constructing a tire in accordance with my invention, I make the outer, or tread side of the tire, of two webs, 1 and 2, these being connected and held in separated position by ribs or posts 3. The inner web 1 is made of a thin section as will safely stand the strain and maintain the casing whole, while the outer web 2 is given an outer coating and wearing surface, or surfaces 4, of whatever character is desired.

This construction forms a chamber 5 which extends entirely about the tire and extends laterally across the width of the tire. The outer web, 2, has a series of holes, 6, located inward from the tread, so as to communicate between the outer side margins of the chamber 5 and the exterior. These holes are for ingress and egress of air which will pass over the surface of the web 1 and maintain it cooled. The holes 6 are preferably made of larger size at the outer surface of the tire than at its inner surface, and these are also preferably located so that their axes are inclined to the plane of the tire, as has been indicated in Fig. 2. As the outer web 2 is compressed by the forward rolling action over the trackway, air will be forced out through the holes 6, while other air will be drawn in through these holes as the outer web recovers its normal position, thereby producing a circulation of air which will keep the tire cool.

Having thus described my invention, what I claim as new, and desire to secure by Letters Patent of the United States of America, is:

A tire having its outer or tread side composed of inner and outer web members and connecting members of compressible material normally holding said webs separated, the outer web having holes at intervals connecting the space between said webs with the exterior, said holes being of relatively large cross section at the outer surface of the web and of small cross section at the inner surface of the web.

Signed at Seattle, Washington, this 21st day of September, 1915.

JAMES C. MARKLE.